Aug. 20, 1929.  H. A. LEONARD  1,725,736

WARPER DRIVING MECHANISM

Filed Sept. 29, 1928

Inventor
Harry A. Leonard
by Heard Smith & Tennant
Attys.

Patented Aug. 20, 1929.

1,725,736

UNITED STATES PATENT OFFICE.

HARRY A. LEONARD, OF HOPEDALE, MASSACHUSETTS, ASSIGNOR TO DRAPER CORPORATION, OF HOPEDALE, MASSACHUSETTS, A CORPORATION OF MAINE.

WARPER-DRIVING MECHANISM.

Application filed September 29, 1928. Serial No. 309,303.

This invention relates to the driving mechanism for a warper such as is employed in winding warp on to a warp beam or for other machines where such a driving mechanism is desirable.

A driving mechanism of this type comprises a loose pulley, a low speed pulley and a high speed pulley, together with a belt shifting mechanism by means of which the driving belt is shifted from one to the other pulley. When the belt is running on the loose pulley, the machine is stopped. In starting the machine, the belt is shifted first to the slow speed pulley which drives the warper at a relatively low speed. The belt is then shifted to the high speed pulley and the warper is then driven at a high speed. Since the pulleys are necessarily of the same diameter and rotate about a common axis, and since the belt is running at the same speed on whichever pulley it may be, the low speed of the warper is usually secured by a reducing mechanism, usually of the pawl and ratchet type interposed between the low speed pulley and the main shaft. It is found in practice that when it is desired to stop the warper and the belt is shifted from the high speed pulley to the low speed pulley and thence to the loose pulley, that the high speed pulley picks up and drives the low speed pulley and is apt to break or injure the pawl and ratchet or other speed reducing mechanism employed.

The object of the present invention is to provide, in connection with a belt shifting mechanism of this character, a brake for the low speed pulley, together with means controlled by the belt shifting means which acts to apply this brake when the belt is shifted to the loose pulley and to relieve the brake when the belt is shifted from the loose pulley.

The invention has for its further object to provide a simple form of attachment which may be applied to existing constructions and which will act in the desired manner thus to prevent rotation of the low speed pulley at an undesirably high speed when the belt is shifted from the high speed pulley to the loose pulley.

These and other objects and features of the invention will appear more fully from the accompanying description and drawings and will be particularly pointed out in the claims.

The drawings illustrate in a general way a familiar type of warper, together with a preferred form of the invention embodied therein.

In the drawings:

Fig. 2 is an enlarged side elevation partially in vertical cross section illustrating a preferred form of the invention as applied to the warper.

Fig. 3 is a front elevation of the construction shown in Fig. 2.

Fig. 4 is a top plan view of a portion of the construction shown in Figs. 2 and 3.

Figure 1:
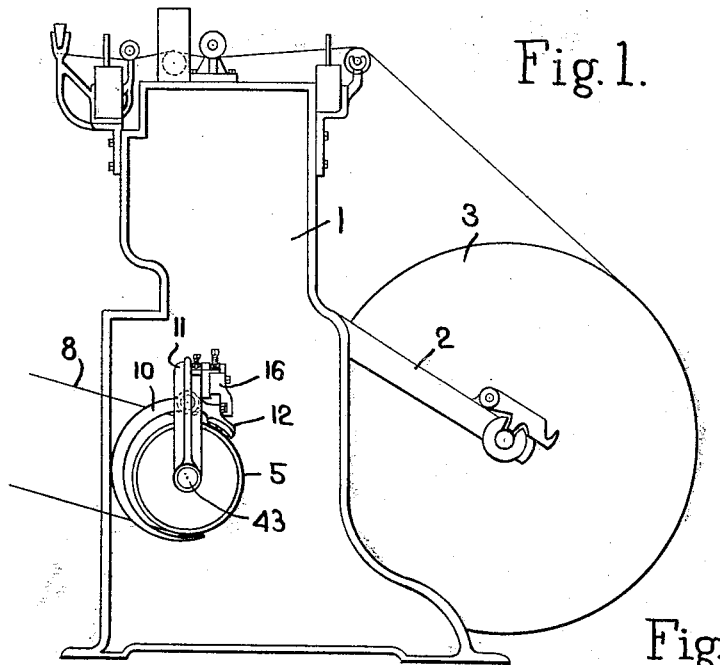
Fig. 1 is a side elevation of the warper.
Figure 1:
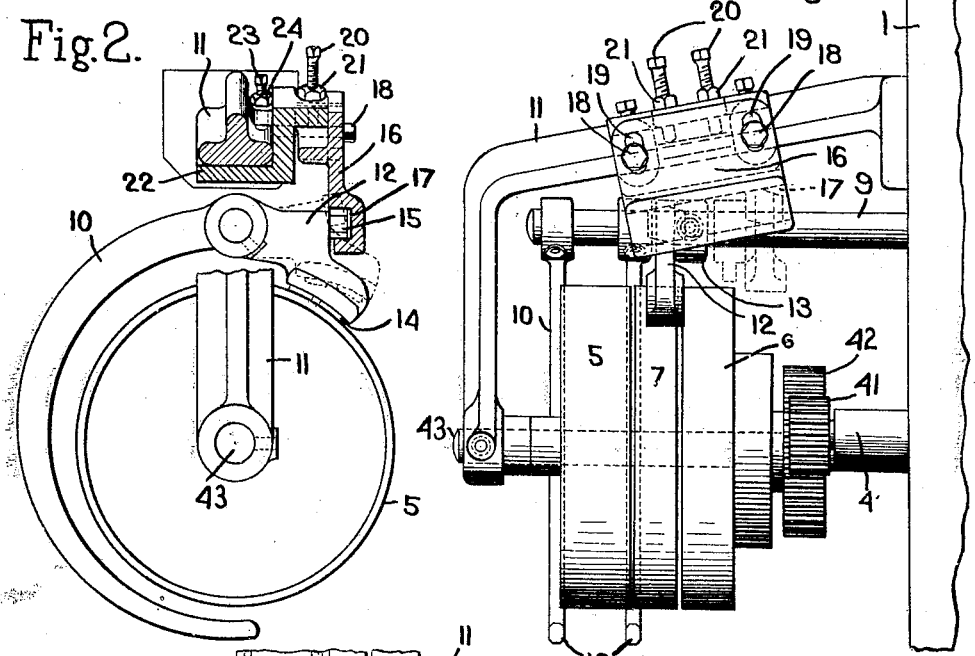

The warper frame 1 is provided with the usual arms 2 in which is journalled the warp beam 3 upon which the warps are wound. The main shaft 4 carries a pinion 41 shown as driven by a gear 42 forming part of a well known and familiar type of mechanism which includes the fixed shaft 43 having journalled thereon the loose pulley 5, the high speed pulley 6 and between these two pulleys the low speed pulley 7. The high speed pulley 6 drives directly the gear 42, which engages the pinion 41, while the low speed pulley is mounted to drive the gear 42 through suitable interposed mechanism, not here necessary to illustrate, at a relatively low speed. Power is applied to the pulleys through a suitable driving belt 8 which is shifted as required from one pulley to the other. This driving belt 8 is shifted by a belt-shifting means shown as comprising a rod 9 longitudinally movable parallel with the pulley axis and provided at its end with curved arms 10 embracing the belt.

The outer end of the shaft 43 is shown as journalled in an angular bracket 11 secured to and projecting from the side frame 1 of the warper.

In the preferred form of the invention, a brake arm 12 is journalled on the rod 9 being held in place between one of the arms 10 and a collar 13 secured to the rod 9. This brake arm extends over the periphery of the pulleys and is provided with a suitable frictional brake shoe 14. This brake arm also is provided with a follower shown as a somewhat hexagonial-shaped stud 15, projecting from the arm above the brake shoe.

A bracket 16 is mounted on the warper frame and is provided with a guideway 17 inclined to the pulley axis. This guideway cooperates with the follower 15 on the brake arm and thus acts to raise and lower the brake shoe as the belt shifter rod 9 is moved toward and from the warper frame. The bracket 16 is shown as clamped to the angular bracket 11. In the construction illustrated, the bracket 16 is made in two parts relatively and vertically adjustable by means of the bolts 18 and slots 19. Extreme accuracy of adjustment is secured by the set screws 20 threaded through one bracket part and abutting the other bracket part and held in place by the lock nuts 21. The bracket 16 as a whole is clamped to the angular arm 11 by means of a flange 22 which underlies the arm 11 and set screws 23 passing through the bracket and abutting the top of the arm 11 and secured in place by a lock nut 24.

The operation of the device will be apparent. When the belt is shifted by the belt shifter from the loose pulley, the belt shifter rod 9 carries the brake arm 12 toward the warper frame and the follower 12 rides up in the guideway 17 and thus swings the brake shoe upward and out of engagement with the low speed pulley 7. When the belt shifter is moved in the opposite direction to shift the belt from the high speed pulley to the low speed pulley, the brake shoe by the same means is swung downward into engagement with the low speed pulley and thus prevents this pulley from being picked up and driven at an undesirable and high speed by the momentum of the high speed pulley.

The bracket 16 and the brake arm 12 form an attachment which may be readily applied to existing structures simply by journalling the brake arm on the belt shifter rod 9 and securing it in place by some such means as the collar 13 and by clamping the bracket 16 at the required position on the angle arm 11. The set screws 23 provide means by which the entire bracket may be adjustably clamped to the machine frame and the bolts 18 with the slots 19 and set screws 20 provide means by which the angular position of the bracket upon and with respect to the machine frame may be adjusted to give the guideway 17 the desired angular relation with respect to the pulley axis.

Having thus described the invention, what is claimed as new, and desired to be secured by Letters Patent, is:

1. Driving mechanism for a machine comprising loose, low speed and high speed pulleys, means for shifting a driving belt from one to the other pulley, a brake for the low speed pulley and means controlled by a belt shifting means acting to apply the brake when the belt is shifted to the loose pulley and to relieve it when the belt is shifted from the loose pulley.

2. Driving mechanism for a machine comprising loose low speed and high speed pulleys, means for shifting a driving belt from one to the other pulley, a brake for the low speed pulley and means acting to apply the brake when the pulley is shifted to the loose pulley and to relieve it when the belt is shifted from the loose pulley.

3. Driving mechanism for a machine comprising loose, low speed and high speed pulleys, a belt shifter movable parallel to the axis of the pulleys to shift the driving belt from one to the other pulley, a brake pivotally mounted on the belt shifter to swing into and out of engagement with the low speed pulley, and a bracket on the machine frame having a guideway inclined to the pulley axis and coacting with the brake to cause the brake to swing into engagement with the low speed pulley as the belt is shifted to the loose pulley and to swing out of engagement as the belt is shifted from the loose pulley.

4. Driving mechanism for a machine comprising loose, low speed and high speed pulleys, a belt shifter rod movable longitudinally and parallel with the pulley axis, a brake arm journalled on said rod having a brake shoe and a follower, a bracket on the machine frame having a guideway for the follower inclined to the pulley axis and coacting with the follower to cause the brake arm to swing the brake shoe into engagement with the low speed pulley as the belt is shifted to the loose pulley and to swing it out of engagement as the belt is shifted from the loose pulley.

5. Driving mechanism for a machine comprising the construction defined in claim 4, together with means for adjusting the angular position of the bracket upon and with respect to the machine frame.

6. A brake attachment for a machine having loose, low speed and high speed pulleys, a driving belt and a belt shifter having a rod movable longitudinally and parallel with the pulley axis, which attachment comprises a brake arm journalled on the said rod and having a brake shoe and a follower, and a bracket on the machine frame having a guideway for the follower inclined to the pulley axis, the follower coacting with the guideway to cause the brake arm to swing the brake shoe into engagement with the low speed pulley as the belt is shifted to the loose pulley and to swing it out of engagement as the belt is shifted from the loose pulley.

7. A brake attachment having the construction defined in claim 6, and also having adjustable means for clamping the bracket thereof to the machine frame.

In testimony whereof, I have signed my name to this specification.

HARRY A. LEONARD.